United States Patent [19]

Abe

[11] Patent Number: 4,753,481

[45] Date of Patent: Jun. 28, 1988

[54] TRIM COVER ASSEMBLY OF A SEAT AND METHOD OF MAKING SAME

[75] Inventor: Tadafumi Abe, Akishima, Japan

[73] Assignee: Tachikawa Spring Co., Ltd., Tokyo, Japan

[21] Appl. No.: 853,045

[22] Filed: Apr. 17, 1986

[30] Foreign Application Priority Data

Apr. 19, 1985 [JP] Japan .................................. 60-84232

[51] Int. Cl.⁴ ............................................... A47C 7/02
[52] U.S. Cl. ......................................... 297/452; 5/407
[58] Field of Search .................... 297/452; 5/280, 407; 428/122, 83, 93, 36

[56] References Cited

U.S. PATENT DOCUMENTS 4,534,595 8/1985 Abe et al. ........................... 297/452
4,625,350 12/1986 Urai et al. ....................... 297/452 X Primary Examiner—James T. McCall
Attorney, Agent, or Firm—Cushman, Darby & Cushman

[57] ABSTRACT

A trim cover assembly of a seat for use as furniture, for use in an automobile or the like is disclosed. The trim cover assembly is provided with a decorative pattern on the surface thereof. To obtain such decorative pattern, a pattern member of a tube is collapsed in a tape form and welded integrally to the surface of the body of the trim cover assembly under heat and pressure.

4 Claims, 3 Drawing Sheets

TRIM COVER ASSEMBLY OF A SEAT AND METHOD OF MAKING SAME

BACKGROUND OF THE INVENTION

1. Field of the Invention

The present invention relates to a trim cover assembly forming the surface of a seat used as furniture, or used in an automobile, and, more particularly, to such trim cover assembly which is provided on the surface thereof with a strip-like pattern member colored differently from the surface so as to heighten the decorative effect of the surface.

2. Description of the Prior Art

When a strip-like pattern piece is provided, for example, in a striped manner on the surface of a trim cover assembly forming the surface of a seat, the aesthetic apperance of the trim cover assembly is improved and thus the seat using such trim cover assembly is increased in commercial value.

Conventionally, in order to produce such pattern piece on the surface of the trim cover assembly in an industrial manner, there is employed a method shown in FIG. 1 (A)(B) through FIG. 3 (A)(B).

Specifically, for example, to obtain a U-shaped pattern piece member substantially on the whole surface of a top cover member (a), as shown in FIG. 1 (A)(B), at first, a material (thermoplastic synthetic resin material) (b) for forming a pattern piece, which is almost equal in size to the top cover member (a), is superposed on the top cover member (a), then the material (b) together with the top cover member (a) is placed onto a lower mold (1), and thereafter a U-shaped upper mold (2) is operated to apply high frequency waves to the material (b) while pressurizing the same.

As a result of this, as shown in FIG. 2 (A)(B), the portion of the material (b) pressurized by the upper mold (2) is welded integrally to the top cover member (a) to provide a welded portion (b1), while other portions thereof (b2)(b2)—remain unwelded to the top cover member (a). Therefore, if the unwelded portions (b2)—are peeled off by holding one end thereof, then the unwelded portions (b2)—can be removed but the welded portion (b1) is left there. Thus, as shown in FIG. 3 (A)(B), the welded portion (b1) is provided on the top cover member (a) in the form of a pattern piece member.

Accordingly, the conventional top cover member having the above-mentioned pattern piece thereon provides a poor yield of the material because the above-mentioned unwelded portions are wasted. Also, since the above-mentioned unwelded portions are peeled off, the end faces of the welded portion (b1) cannot be finished up beautifully. Further, during such peel-off operation, there is a possibility of the welded portion (b1) being taken off by mistake.

SUMMARY OF THE INVENTION

The present invention aims at eliminating the drawbacks found in the above-mentioned conventional trim cover assembly including a top cover member provided on the surface thereof with a pattern piece which is formed by placing a pattern piece forming material onto the surface of the top cover member and then welding a portion of the pattern piece forming material to the top cover member surface by means of high frequency waves.

Accordingly, it is an object of the invention to provide a trim cover assembly provided with an improved pattern on the surface thereof which is highly flexible and fine in appearance.

To accomplish this object, according to the invention, a tube-like pattern member of a thermoplastic synthetic resin material is heated and pressurized onto the surface of the body of the trim cover assembly to be welded integrally therewith, and is then collapsed in a tape form to provide a decorative pattern on the surface of the trim cover assembly body. Since the above-mentioned pattern member is formed in a tube shape, it is highly flexible so that it can be curved into a U-shaped form or other forms and thus can be welded easily to the surface of the trim cover assembly body. Also, for the same reason as above, there is no possibility that, during such welding of the pattern member, there will be produced any wrinkles which may impair the aesthetic appearance of the body of the trim cover assembly.

The above and other related objects and features of the invention will be apparent from a reading of the following detailed description of the disclosure in connection with the accompanying drawings and the novelty thereof pointed out in the appended claims.

BRIEF DESCRIPTION OF THE DRAWINGS

FIG. 1 (A) is a plan view of the above-mentioned conventional top cover member, illustrating a state in which a pattern piece member is being welded to the top cover member;

FIG. 1 (B) is a cross section view taken along line X—X in FIG. 1 (A);

DETAILED DESCRIPTION OF A PREFERRED EMBODIMENT OF THE INVENTION

Figure 1A:
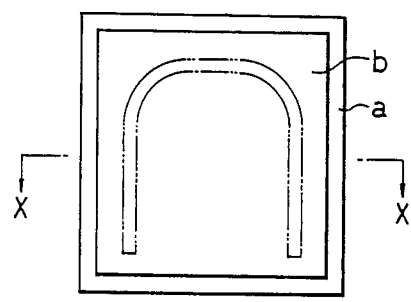
FIGS. 1 (A), (B) and 2 (A), (B) illustrate a conventional method of manufacturing a trim cover assembly, especially the top cover member thereof.
Figure 1B:
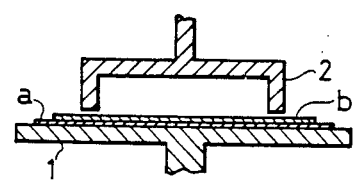
Figure 2A:
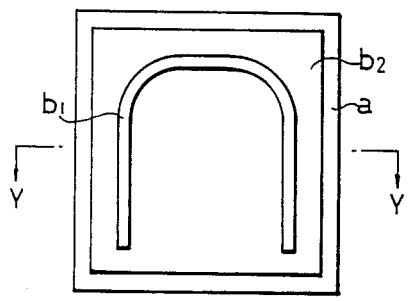
FIG. 2(A) is a plan view of the conventional top cover member, illustrating a state in which the pattern piece member has been welded to the top cover member.
Figure 2B:
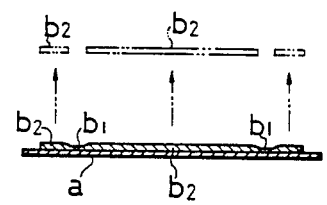
FIG. 2(B) is a section view taken along line Y—Y in FIG. 2(A)
Figure 3A:
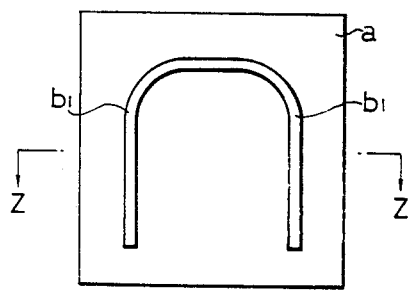
FIG. 3(A) is a plan view of the conventional top cover member, illustrating a state in which the unnecessary portions of the welded pattern piece member have been removed.
Figure 3B:
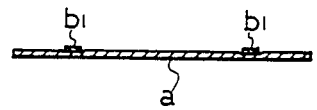
FIG. 3(B) is a section view taken along line Z—Z in FIG. 3(A)
Figure 4:
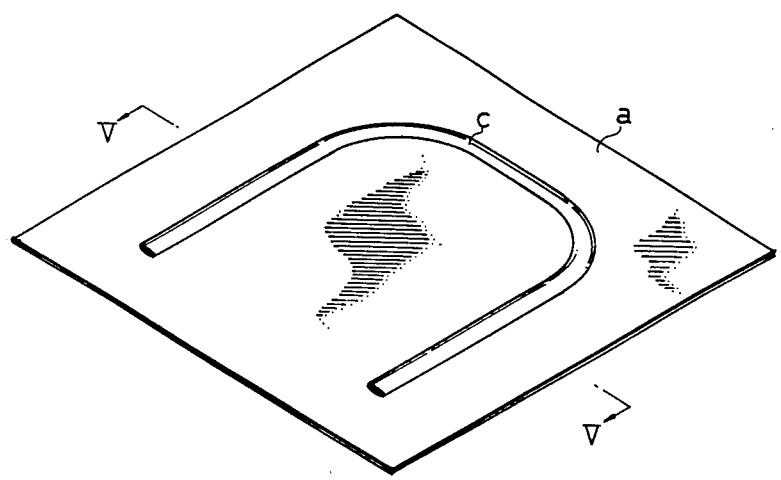
FIG. 4 is a perspective view of an embodiment of the present invention.
Figure 5:
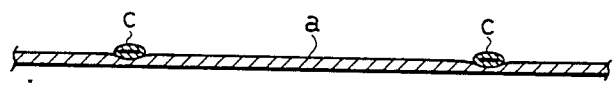
FIG. 5 is a partially enlarged section view taken along line V—V in FIG. 4.

In FIGS. 4 and 5, there is illustrated an embodiment of the invention. In the drawings, reference character (a) designates the body of a trim cover assembly manufactured in accordance with the present invention. The illustrated body (a) is composed of a single member formed of a thermoplastic synthetic resin material (for example, P.V.C., polyester, polypropylene or the like). However, the trim cover assembly body may also be formed in a three-layer structure including a top cover member, a wadding of foam material and a wadding cover. By the way, the body of the trim cover assembly is referred to as the trim cover body hereinafter.

A U-shaped pattern member (c) for decoration is welded to the surface of the trim cover body (a) by means of high frequency waves.

Figure 6:
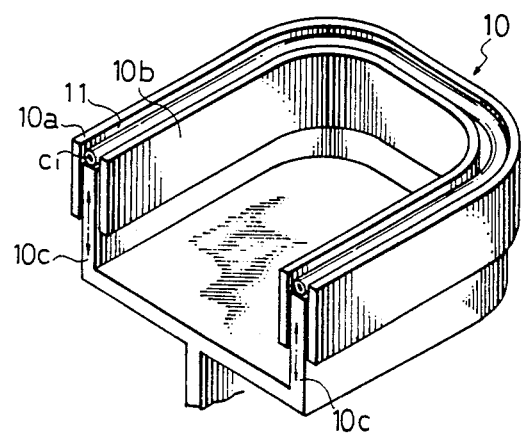
FIG. 6 is a perspective view of a welding mold employed in the invention.
Figure 7:
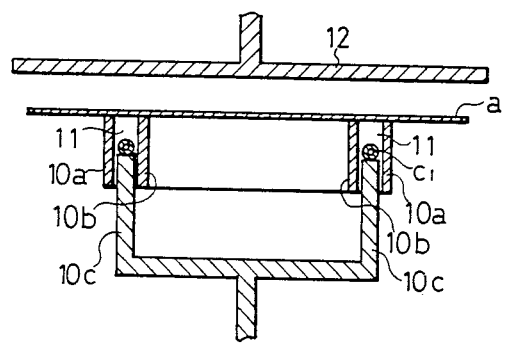
FIG. 7 is a section view of the above embodiment of the invention, illustrating a state in which a pattern piece member is not yet welded to the body of the present trim cover assembly; and, FIG. 8 is a section view of the same embodiment, illustrating a state in which the pattern piece member has been welded to the trim cover assembly body.
Figure 8:
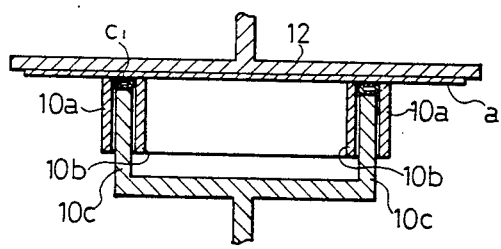

The above-mentioned decorative pattern member (c) can be welded to the surface of the trim cover body (a) in a method shown in FIGS. 6 to 8.

Specifically, as shown in FIG. 6, a lower mold (10) of a high frequency welding machine is provided with a guide groove (11) which is defined in a U-shaped form by two guide members (10a), (10b), and also is provided with a welding electrode (10c) which is disposed within the guide groove (11) such that it can be moved up and down. In a state in which the electrode (10c) is lowered down, a pattern member (c1) formed of a tube is inserted into the guide groove (11). The pattern member (c1) is formed in a tubular shape of a flexible thermoplastic synthetic resin material such as P.V.C. to be welded to the surface of the trim cover body (a) by means of high frequency waves, and also is colored differently from the surface of the trim cover body (a).

After the pattern member (c1) has been inserted into the guide groove (11) of the lower mold (10), the trim cover body (a) is placed onto the lower mold (10) with the top surface of the trim cover body (a) facing to the lower mold (10), (FIG. 7). In the drawings, (12) designates an upper mold of the high frequency welding machine.

Next, after the upper mold (12) is lowered and brought into contact with the trim cover body(a), the electrode (10c) of the lower mold (10) is moved upwardly to press the the pattern body (c1) against the surface of the trim cover body (a) for collapsing the pattern body (c1). Then, if the high frequency waves are applied thereto, (FIG. 8), as shown in FIGS. 4 and 5, the pattern member (c1) of a tube is then collapsed in a flat strip and welded to the surface of the trim cover body (a) to provide a decorative pattern (c) thereon.

As has been discussed hereinbefore, according to the present invention, since the pattern member of a tube is welded to the trim cover body, when forming a pattern of a curved shape such as a U shape or the like in the trim cover body, the pattern member can be curved with ease and without creating wrinkles or other unfavorable phenomena so as to provide a pattern of a predetermined curved form.

Also, because there is eliminated the need for removal of the unwelded portions as in the above-mentioned conventional device, the invention provides a good yield of the material and the appearance of the trim cover body can not be impaired.

What is claimed is:

1. A trim cover assembly of a seat comprising:
   a thermally-weldable body; and
   a pattern member including an elongated tubular member welded under heat and pressure to the surface of said body so as to be integral therewith, said tubular member being collapsed so as to completely close the bore therethrough so as to define a substantially flat, elongated tape form on said surface of said body to thereby provide a decorative pattern thereon which is substantially flush with the surface of said body to which it is welded.

2. The trim cover assembly as claimed in claim 1, wherein said pattern member is colored in different color from that of said body surface.

3. A trim cover assembly as in claim 1, wherein said tubular member of said pattern member has a length greater than a width of said thermally-weldable body.

4. A trim cover assembly as in claim 3, wherein said pattern member is disposed on said surface of said body so as to define a U-shaped decorative pattern thereon.

* * * * *